US012482410B2

(12) United States Patent
Xi et al.

(10) Patent No.: US 12,482,410 B2
(45) Date of Patent: Nov. 25, 2025

(54) DISPLAY PANEL, DRIVING METHOD FOR THE SAME, AND DISPLAY DEVICE

(71) Applicant: Wuhan Tianma Microelectronics Co., Ltd., Wuhan (CN)

(72) Inventors: Suping Xi, Wuhan (CN); Maoqing Zhou, Wuhan (CN)

(73) Assignee: Wuhan Tianma Microelectronics Co., Ltd., Wuhan (CN)

( * ) Notice: Subject to any disclaimer, the term of this patent is extended or adjusted under 35 U.S.C. 154(b) by 43 days.

(21) Appl. No.: 18/755,738

(22) Filed: Jun. 27, 2024

(65) Prior Publication Data

US 2024/0346993 A1 Oct. 17, 2024

(30) Foreign Application Priority Data

Mar. 22, 2024 (CN) .......................... 202410342146.8

(51) Int. Cl.
*G09G 3/32* (2016.01)
*G11C 19/28* (2006.01)

(52) U.S. Cl.
CPC ............. *G09G 3/32* (2013.01); *G11C 19/287* (2013.01); *G09G 2310/0286* (2013.01); *G09G 2310/08* (2013.01); *G09G 2320/0233* (2013.01)

(58) Field of Classification Search
CPC ............. G09G 3/32; G09G 2310/0286; G09G 2310/08; G09G 2320/0233; G09G 3/20; G09G 3/3266; G11C 19/287; G11C 19/28
See application file for complete search history.

(56) References Cited

U.S. PATENT DOCUMENTS

| 9,105,230 B2 * | 8/2015 | Kim ..................... G09G 3/3208 |
| 11,783,783 B2 * | 10/2023 | Kang ................... H10D 86/471 345/55 |
| 11,935,460 B2 * | 3/2024 | Zhao .................... G09G 3/2092 |
| 2013/0038587 A1 * | 2/2013 | Song ....................... G09G 3/20 345/204 |
| 2017/0039950 A1 * | 2/2017 | Li ........................... G11C 19/28 |

* cited by examiner

*Primary Examiner* — Pegeman Karimi
(74) *Attorney, Agent, or Firm* — Wiersch Law Group

(57) ABSTRACT

Provided in the embodiments of the present discourse are a display panel, a driving method for the same, and a display device. The display panel includes: a first shift register including a plurality of cascaded first shift units; a first signal line electrically connected to the plurality of first shift units for providing a level voltage required to be output by the first shift units; and a second signal line receiving a same level voltage as the first signal line, where at least one switch unit is connected between the second signal line and the first signal line. The display panel has a first mode, and in the first mode, the first shift units output at least two pluses within one frame, and at least a part of the switch units are turned on.

18 Claims, 13 Drawing Sheets

Mode1:

DISPLAY PANEL, DRIVING METHOD FOR THE SAME, AND DISPLAY DEVICE

CROSS-REFERENCE TO RELATED APPLICATION

The present application claims priority to Chinese Patent Application No. 202410342146.8, filed on Mar. 22, 2024, the content of which is incorporated herein by reference in its entirety.

TECHNICAL FIELD

The present disclosure relates to the field of display technology and, in particular, to a display panel, a driving method for the same, and a display device.

BACKGROUND

A display panel includes a shift register, which is used to output a driving signal such as a light-emitting control signal to pixel circuit. The shift register includes a plurality of cascaded shift units, which are connected to a fixed-potential signal line. The fixed-potential signal line is used to provide a level voltage required to be output by the shift units.

However, in practical applications, there is a problem of significant voltage difference of the pulses output by the shift units on the top and bottom sides due to a larger load on the fixed-potential signal line, resulting in poor brightness uniformity of the display panel.

SUMMARY

In view of the above, embodiments of the present disclosure provide a display panel, a driving method for the same, and a display device, for reducing the level difference of the pulses output by the shift units at different positions.

In one aspect, an embodiment of the present disclosure provides a display panel, including:
- a first shift register including a plurality of cascaded first shift units;
- a first signal line electrically connected to the first shift units for providing a level voltage required to be output by the first shift units; and
- a second signal line receiving a same level voltage as the first signal line, where at least one switch unit is connected between the second signal line and the first signal line;
- where the display panel has a first mode, and in the first mode, the first shift units output at least two pluses within one frame, and at least a part of the switch units are turned on.

In another aspect, an embodiment of the present disclosure provides a driving method for a display panel, where the display panel includes:
- a first shift register including a plurality of cascaded first shift units;
- a first signal line electrically connected to the first shift units for providing a level voltage required to be output by the first shift units; and
- a second signal line receiving a same level voltage as the first signal line, where at least one switch unit is connected between the second signal line and the first signal line;
- the display panel has a first mode, and the driving method includes: in the first mode, controlling the first shift units to output at least two pulses within one frame, and controlling at least a part of the switch units to be turned on.

In yet another aspect, an embodiment of the present disclosure provides a display device, including the above display panel.

Any of the above technical solutions has the following advantageous effects:

In the embodiments of the present disclosure, the first signal line is electrically connected to the second signal line through the switch units, for example, the second signal line may be an additionally provided signal line that receives the same voltage as the first signal line and is not connected to the shift units. In the first mode, the connection path(s) between the first signal line and the second signal line can be constructed by controlling at least a part of the switch units to be turned on. The voltage on the first signal line is adjusted with the aid of the relatively stable and almost uniformly linear voltage on the second signal line, in order to counteract the attenuation of the voltage on the first signal line. For example, For example, when both the first signal line and the second signal line receive a high-level voltage, the voltage on the first signal line can be raised with the aid of the voltage on the second signal line, which weakens the difference between the high-level voltages output by the first shift units on the top and bottom sides, and in turn weakens the difference between the difference value between the high and low levels of the pulses output by the first shift units on the top side and the difference value between the high and low levels of the pulses output by the first shift units on the bottom side, reducing the difference in the coupling of the node voltages in the pixel circuits on the top and bottom sides caused by the high and low jumps of the pulse signals, and improving the problem of poor brightness uniformity of the panel when driven by multiple pulses.

BRIEF DESCRIPTION OF DRAWINGS

To describe the technical solutions in the embodiments of the present disclosure more clearly, apparently, the drawings in the following description show merely some embodiments of the present disclosure, and a person of ordinary skill in the art may still derive other drawings from these drawings without creative efforts.

DESCRIPTION OF EMBODIMENTS

For a better understanding of the technical solutions of the present disclosure, the embodiments of the present disclosure are described in detail below in conjunction with the drawings.

It should be noted that the embodiments described are merely some rather than all of the embodiments of the present disclosure. All other embodiments obtained by a person of ordinary skill in the art on the basis of the embodiments of the present disclosure without creative efforts shall fall within the protection scope of the present disclosure.

Terms used in the embodiments of the present disclosure are only for the purpose of describing specific embodiments, and are not intended to limit the present disclosure. Unless otherwise specified in the context, words, such as "a", "the", and "this", in a singular form in the embodiments of the present disclosure and the appended claims include plural forms.

It should be understood that the term "and/or" used herein merely describes associations between associated objects, and it indicates three types of relationships, for example, A and/or B may indicate that A exists alone, A and B coexist, or B exists alone. In addition, the character "/" herein generally indicates that the associated objects are in an "or" relationship.

Before describing the technical solutions provided by the embodiments of the present disclosure, the present disclosure begins with a detailed description of the technical problem.

Figure 1:
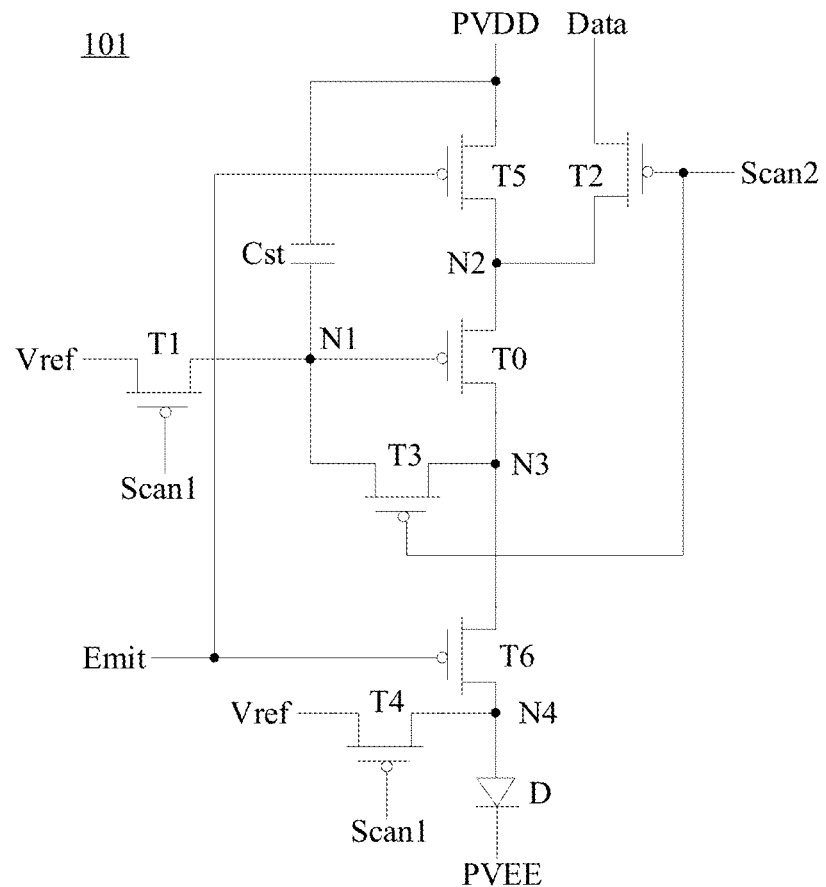
FIG. 1 is a structural schematic diagram of a pixel circuit in the relevant art.

As shown in FIG. 1, which is a structural schematic diagram of a pixel circuit in the relevant art, the pixel circuit 101 includes a driving transistor T0, a gate reset transistor T1, a data writing transistor T2, a threshold compensation transistor T3, an anode reset transistor T4, a first light-emitting control transistor T5, a second light-emitting control transistor T6 and a storage capacitor $C_{st}$.

A gate of the driving transistor T0 is electrically connected to a first node N1, a first electrode of the driving transistor T0 is electrically connected to a second node N2, and a second electrode of the driving transistor T0 is electrically connected to a third node N3.

A gate of the gate reset transistor T1 is electrically connected to a first scanning signal line Scan1, a first electrode of the gate reset transistor T1 is electrically connected to a reset signal line Vref, and a second electrode of the gate reset transistor T1 is electrically connected to the first node N1. A gate of the anode reset transistor T4 is electrically connected to the first scanning signal line Scan1, a first electrode of the anode reset transistor T4 is electrically connected to the reset signal line Vref, and a second electrode of the anode reset transistor T4 is electrically connected to an anode of a light-emitting element D.

A gate of the data writing transistor T2 is electrically connected to a second scanning signal line Scan2, a first electrode of the data writing transistor T2 is electrically connected to a data line Data, and a second electrode of the data writing transistor T2 is electrically connected to the second node N2. A gate of the threshold compensation transistor T3 is electrically connected to the second scanning signal line Scan2, a first electrode of the threshold compensation transistor T3 is electrically connected to the third node N3, and a second electrode of the threshold compensation transistor T3 is electrically connected to the first node N1.

A gate of the first light-emitting control transistor T5 is electrically connected to a light-emitting control signal line Emit, a first electrode of the first light-emitting control transistor T5 is electrically connected to a power line PVDD, and a second electrode of the first light-emitting control transistor T5 is electrically connected to the second node N2. A gate of the second light-emitting control transistor T6 is electrically connected to the light-emitting control signal line Emit, a first electrode of the second light-emitting control transistor T6 is electrically connected to the third node N3, and a second electrode of the second light-emitting control transistor T6 is electrically connected to the anode of the light-emitting element D.

A first plate of the storage capacitor $C_{st}$ is electrically connected to the power line PVDD, and a second plate of the storage capacitor C is electrically connected to the first node N1.

Figure 2:
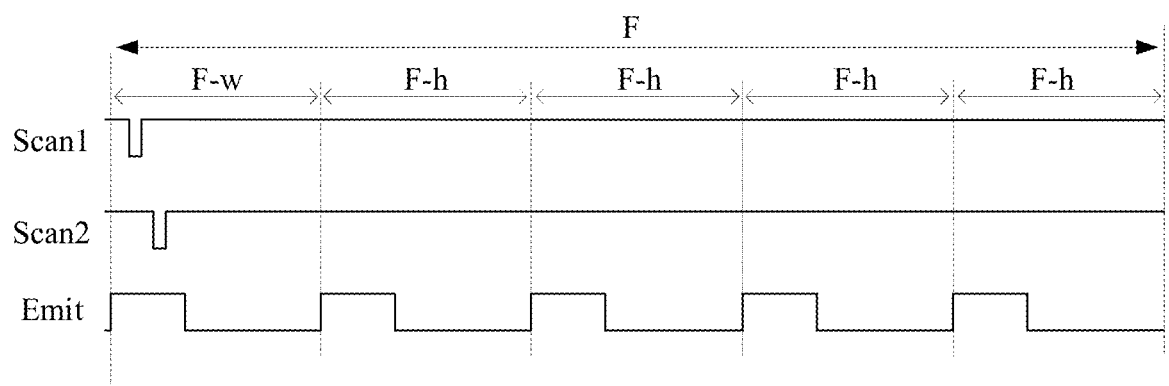
FIG. 2 is a timing diagram corresponding to FIG. 1.

In some display modes, for example a low-frequency display mode, as shown in FIG. 2, which is a timing diagram corresponding to FIG. 1, a frame F includes a writing frame F-w and at least one holding frame F-h.

In the writing frame F-w, the pixel circuit 101 performs initialization, charging, and light-emitting operations in sequence. When the initialization operation is performed, the gate reset transistor T1 and the anode reset transistor T4 are turned on in response to an enable level (low level) output by the first scanning signal line Scan1, to reset the first node N1 and the anode of the light-emitting element D, respectively. When the charging operation is performed, the data writing transistor T2 and the threshold compensation transistor T3 are turned on in response to an enable level (low level) output by the second scanning signal line Scan2, to write a data voltage into the driving transistor T0 and perform threshold compensation of the driving transistor T0. During the light-emitting operation is performed, the first light-emitting control transistor T5 and the second light-emitting control transistor T6 are turned on in response to an enable level (low level) output by the light-emitting control signal line Emit, to control a driving current converted by the driving transistor T0 to flow into the light-emitting element D to cause the light-emitting element D to emit light. In the holding frame F-h, the pixel circuit 101 does not perform the initialization and charging operations, but performs only the light-emitting operation.

In the above display mode, the light-emitting control signal line Emit outputs multiple pulses within one frame. However, due to parasitic capacitances of the first light-emitting control transistor T5 and the second light-emitting control transistor T6, when the light-emitting control signal undergoes high and low jumps, the potentials of the second node N2 and a fourth node N4 will fluctuate accordingly. Especially in the holding frame F-h, since the pixel circuit 101 no longer writes a data voltage to the second node N2 and no longer resets the fourth node N4 within the holding frame F-h, the potential fluctuation of the nodes caused by the jump of the light-emitting control signal will directly affect the light-emitting brightness of the light-emitting element D.

In particular, in the holding frame F-h, when the light-emitting control signal jumps from low to high, the potentials of the second node N2 and the fourth node N4 are pulled up. The potential of the second node N2 being pulled up will cause a change in the state of the driving transistor T0, which in turn affects the light-emitting current converted by the driving transistor T0 such that the light-emitting brightness is affected. The potential of the fourth node N4 being pulled up will make the light-emitting element D easy to light up, resulting in the problem of sub-pixel translucent. The above problems all may affect the brightness uniformity of a display panel at low grayscale.

Figure 3:
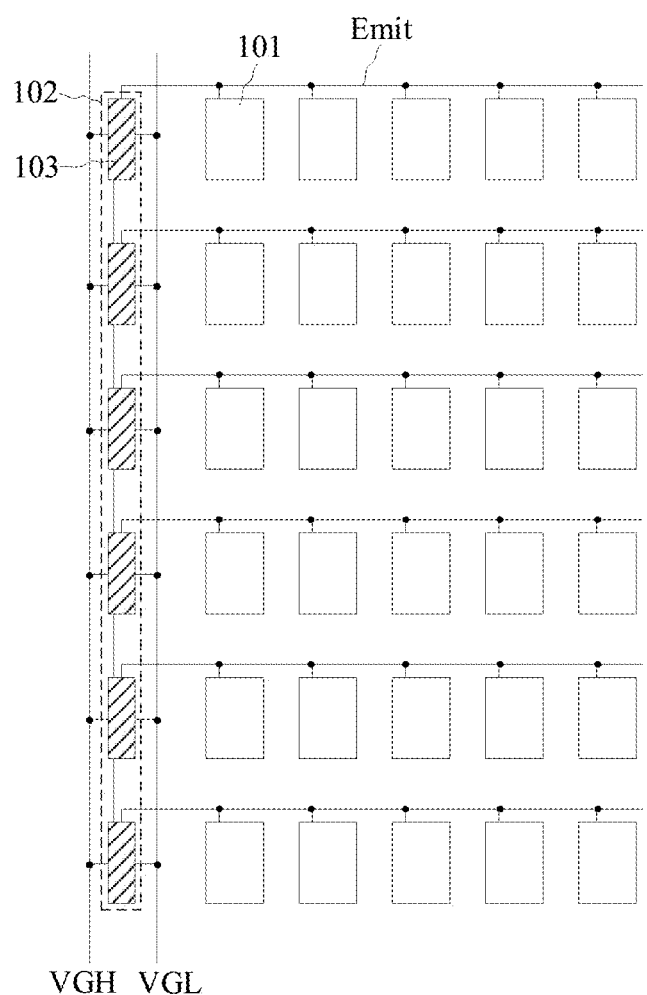
FIG. 3 is a structural schematic diagram of a display panel in the relevant art.

At present, the light-emitting control signal is provided by an emission shift register. As shown in FIG. 3, which is a structural schematic diagram of a display panel in the relevant art, the display panel further includes an emission shift register 102, which includes a plurality of cascaded emission shift units 103. The emission shift units 103 are electrically connected to the pixel circuits 101 through the light-emitting control signal lines Emit. The plurality of emission shift units 103 are further electrically connected to a high-level signal line VGH and a low-level signal line VGL, where the high-level signal line VGH is used to provide the high-level voltage in the pulses required to be output by the emission shift units 103, and the low-level signal line VGL is used to provide the low-level voltage in the pulses required to be output by the emission shift units 103.

When the light-emitting control signal line Emit is subjected to multi-pulse driving, the emission shift unit 103 in each stage needs to be turned on at least twice within one frame to output pulses to the light-emitting control signal line Emit, which may make the loads of the high-level signal line VGH and the low-level signal line VGL very high, resulting in a significant difference between the level voltages transmitted by the level signal lines on the top and bottom sides.

In particular, for the high-level voltage, assuming that a standard high-level voltage is set to $VGH_1$, due to the influence of the load on the high level signal line VGH, the closer to the top side of the panel, the greater the deviation of the level voltage transmitted on the high-level signal line VGH from the standard high-level voltage $VGH_1$, so that the following condition occurs: a high-level voltage $VGH_{12}$ output by the emission shift unit 103 on the top side<a high-level voltage $VGH_{11}$ output by the emission shift unit 103 on the bottom side<$VGH_1$. Similarly, for the low-level voltage, assuming that a standard low-level voltage is set to $VGL_1$ (generally a negative value), due to the influence of the load on the low-level signal line VGL, the closer to the top side of the panel, the greater the deviation of the level voltage transmitted on the low-level signal line VGL from the standard low-level voltage $VGL_1$, so that the following condition occurs: $VGL_1$<a low-level voltage $VGL_{11}$ output by the emission shift unit 103 on the bottom side<a low-level voltage $VGL_{12}$ output by the emission shift unit 103 on the top side.

In this way, there will be a significant difference between the voltage difference $VGH_{12}$-$VGL_{12}$ between the high and low levels of the pulses output by the emission shift unit 103 on the top side and the voltage difference $VGH_{22}$-$VGL_{22}$ between the high and low levels of the pulses output by the emission shift unit 103 on the bottom side, resulting in a significant difference in the coupling amount of the second nodes N2 and the fourth nodes N4 in the pixel circuits 101 on the top and bottom sides, which exacerbates the undesirable effects caused by node coupling and further deteriorates the brightness uniformity of the display panel.

Figure 4:
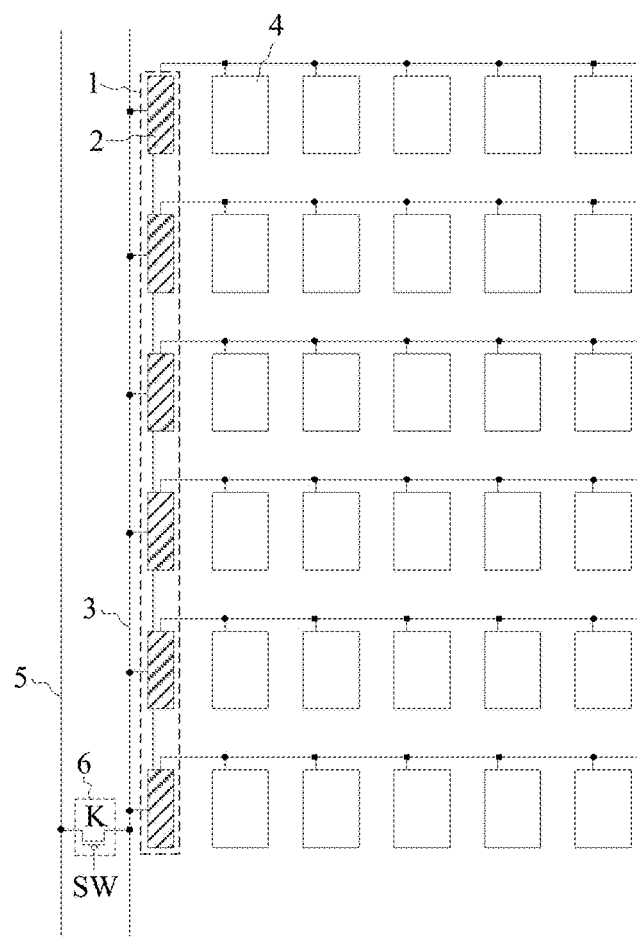
FIG. 4 is a structural schematic diagram of a display panel provided by an embodiment of the present disclosure.

In this regard, an embodiment of the present disclosure provides a display panel. As shown in FIG. 4, which is a structural schematic diagram of the display panel provided by the embodiment of the present disclosure, the display panel includes a first shift register 1, which includes a plurality of cascaded first shift units 2. In the present disclosure, each of the first shift units 2 can be electrically connected to the pixel circuits 4 through the light-emitting control signal line Emit for outputting a light-emitting control signal to the pixel circuits 4.

The display panel further includes a first signal line 3 electrically connected to the plurality of first shift units 2 for providing a level voltage required to be output by the first shift units 2.

The display panel further includes a second signal line 5 receiving the same voltage signal as the first signal line 3. For example, when the first signal line 3 receives a high-level voltage, the second signal line 5 receives the same high-level voltage, and when the first signal line 3 receives a low-level voltage, the second signal line 5 receives the same low-level voltage. In addition, at least one switch unit 6 is connected between the second signal line 5 and the first signal line 3.

Figure 5:
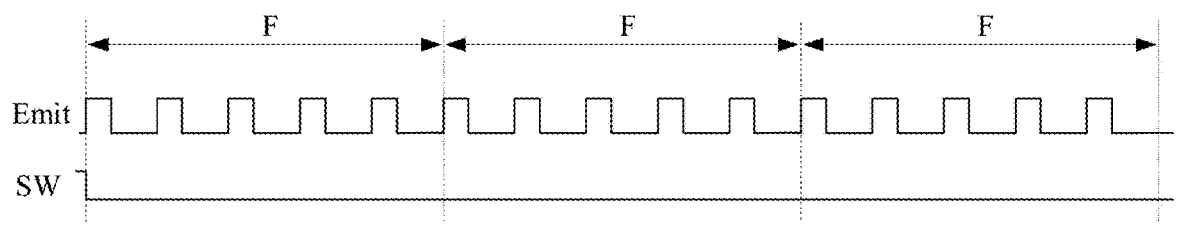
FIG. 5 is a timing diagram provided by an embodiment of the present disclosure.

The display panel has a first mode Mode1, as shown in FIG. 5, which is a timing diagram provided by an embodiment of the present disclosure. In the first mode Mode1, the first shift units 2 output at least two pulses in one frame F, and at least a part of the switch units 6 are turned on.

In the first mode Mode1, the first shift units 2 output at least two pulses in one frame F, that is, the pixel circuits 4 are subjected to multi-pulse driving. Combined with the above analysis, it can be seen that in this way, the first shift units 2 in all stages need to be turned on multiple times in one frame, causing a large load on the first signal line 3, which in turn results in the problem of different coupling degrees of nodes in the pixel circuits 4 on the top and bottom sides.

In an embodiment of the present disclosure, the first signal line 3 is electrically connected to the second signal line 5 through the switch unit(s) 6. The second signal line 5 may be an additionally provided signal line with a small load, receives the same voltage as the first signal line 3, and is not connected to the shift units. In the first mode Mode1, the connection path(s) between the first signal line 3 and the second signal line 5 can be constructed by controlling at least a part of the switch units 6 to be turned on. The voltage on the first signal line 3 is adjusted with the aid of the relatively stable and almost uniformly linear voltage on the second signal line 5, in order to counteract the attenuation of the voltage on the first signal line 3. For example, when both the first signal line 3 and the second signal line 5 receive a high-level voltage, the voltage on the first signal line 3 can be raised with the aid of the voltage on the second signal line 5, which weakens the difference between the high-level voltages output by the first shift units 2 on the top and bottom sides, and in turn weakens the difference between the difference value between the high and low levels of the pulses output by the first shift units 2 on the top side and the difference value between the high and low levels of the pulses output by the first shift units 2 on the bottom side, reducing the difference in the coupling of the node voltages in the pixel circuits 4 on the top and bottom sides caused by the high and low jumps of the pulse signals, and improving the problem of poor brightness uniformity of the panel when driven by multiple pulses.

Figure 6:
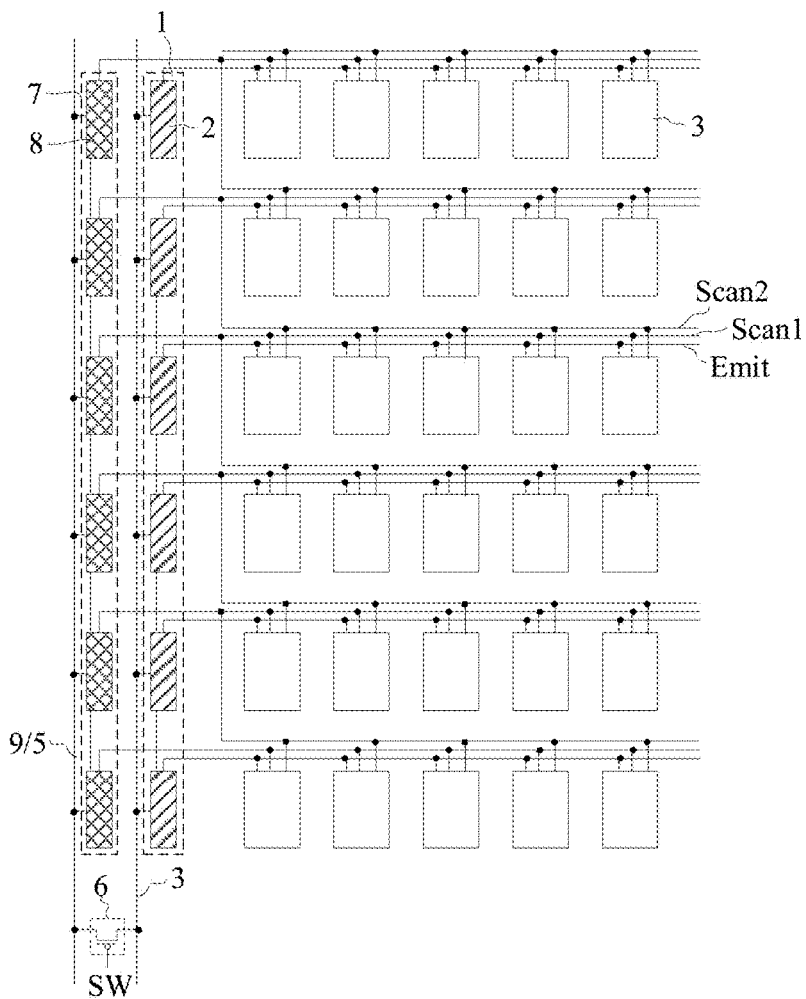
FIG. 6 is another structural schematic diagram of a display panel provided by an embodiment of the present disclosure.
Figure 7:
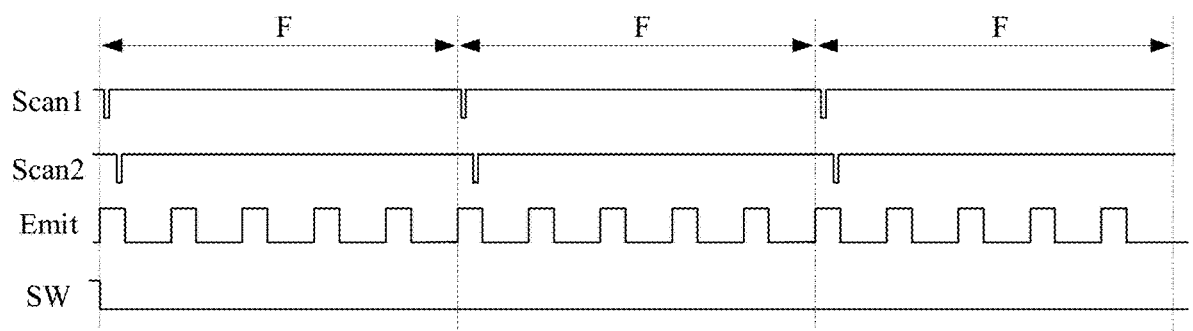
FIG. 7 is another timing diagram provided by an embodiment of the present disclosure.

In a feasible implementation, as shown in FIG. 6 and FIG. 7, FIG. 6 is another structural schematic diagram of a display panel provided by an embodiment of the present disclosure, and FIG. 7 is another timing diagram provided by an embodiment of the present disclosure, the display panel further includes a second shift register 7 and a third signal line 9. The second shift register 7 includes a plurality of cascaded second shift units 8, and the third signal line 9 is electrically connected to the plurality of second shift units 8 for providing a level voltage required to be output by the second shift units 8.

The third signal line 9 is reused as the second signal line 5. In addition, in the first mode Mode1, within one frame, the number of pulses output by the second shift units 8 is less than the number of pulses output by the first shift units 2.

Compared with the multi-pulse driving of the first shift units 2, the second shift units 8 are only subjected to low-pulse driving. At this point, the second shift unit 8 in each stage needs to be turned on less times within one frame F, such that the load on the third signal line 9 is less. Correspondingly, the voltage signal transmitted on the third signal line 9 has less attenuation and better linearity. To this end, in the embodiment of the present disclosure, the third signal line 9 can be directly reused as the second signal line 5, and in the first mode Mode1, the attenuation of the voltage on the first signal line 3 is counteracted with the aid of the voltage on the third signal line 9. In this way, it is not necessary to additionally add another signal line as the second signal line 5, and the structural design can be simplified.

Furthermore, referring to FIG. 6 again, the first shift units 2 are electrically connected to the pixel circuits 4 through the light-emitting control signal lines Emit, and the second shift units 8 are electrically connected to the pixel circuits 4 through the scanning signal lines. In an implementation, the second shift units 8 can be electrically connected to the pixel circuits 4 through the first scanning signal line Scan1 and the second scanning signal line Scan2, respectively.

That is, the first shift units 2 are emission shift units for outputting the light-emitting control signal to the pixel circuits 4, and the second shift units 8 are scanning shift units for outputting the scanning signal to the pixel circuits 4. This structure reuses the level signal line originally existing in the display panel and electrically connected to the scanning shift units as the second signal line 5. Because the scanning shift units are subjected to single-pulse driving, the level signal line connected to the scanning shift units has a very small load, and the effect of adjusting the voltage on the second signal line 5 is better.

Figure 8:
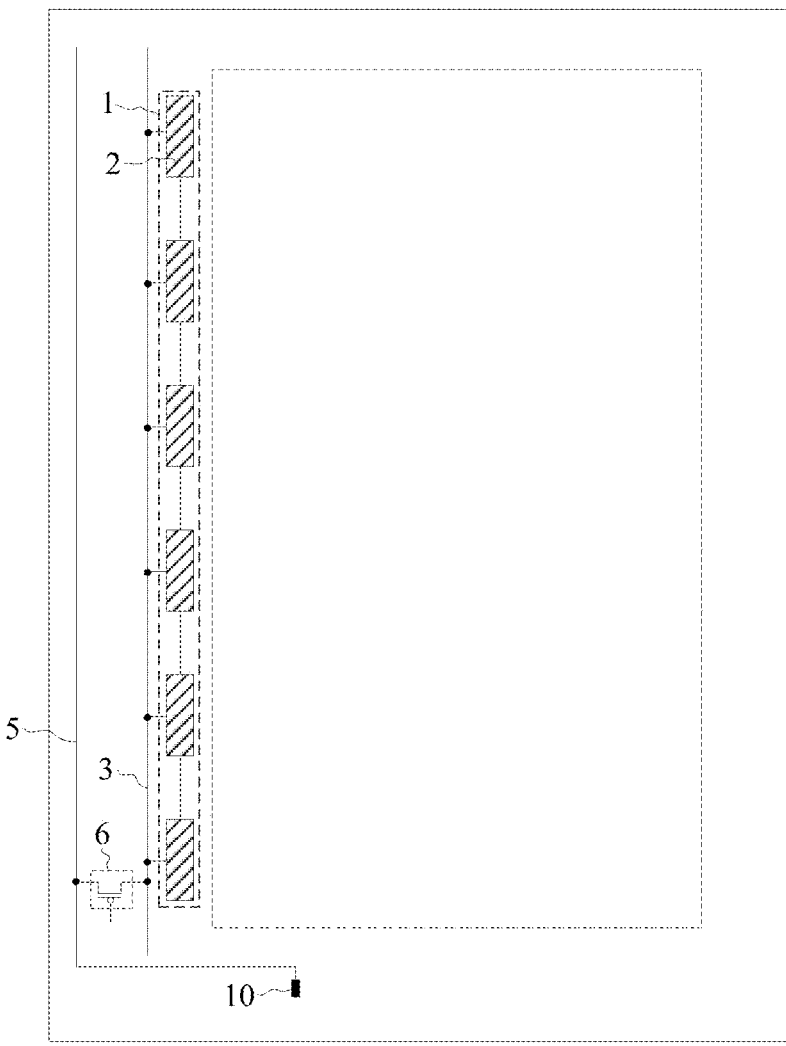
FIG. 8 is yet another structural schematic diagram of a display panel provided by an embodiment of the present disclosure.

In a feasible implementation, as shown in FIG. 8, which is yet another structural schematic diagram of a display panel provided by an embodiment of the present disclosure. The second signal line 5 is directly electrically connected only to a first signal pin 10 and the switch units 6.

That is, in this structure, the second signal line 5 is a newly added signal line that is not connected to other shift units. The second signal line 5 is only used to counteract the attenuation of the voltage on the first signal line 3 and is not used for other purposes. On the one hand, the second signal line 5 of this kind is not loaded with a structure such as shifting units and has a smaller load, and the signal transmitted thereby is more stable, such that the effect of counteracting the attenuation of the voltage on the first signal line 3 is better. On the other hand, even if the voltage signal on the first signal line 3 may have some influence on the voltage signal on the second signal line 5 when the switch units 6 are turned on, the realization of the functions of other structures will not be affected.

In a feasible implementation, in the first mode Mode1, the number of pulses output by the first shift units 2 within one frame F is greater than or equal to 12.

During the operation of the display panel, when the number of pulses required to be output by the first shift units 2 within one frame F in a to-be-displayed mode is greater than or equal to 12, the display mode can be defined as the first mode Mode1, and at least a part of the switch units 6 is/are controlled to be turned on in the first mode Mode1. When the number of pulses required to be output by the first shift units 2 within one frame F in the to-be-displayed mode is less than 12, the switch units 6 can be controlled to be turned off.

It can be understood that the number of pulses required to be output by the first shift units 2 within one frame F is related to a driving frequency of the display panel. The lower the driving frequency, the greater the number of pulses required to be output by the first shift units 2 within one frame F. In an embodiment of the present disclosure, the number of pulses required to be output by the first shift units 2 within one frame F in the driving mode can be obtained according to the magnitude of the driving frequency, and in turn it is possible to select whether or not to turn on the switch units 6.

This setting method is to pre-set a threshold pulse number. When the number of pulses required to be output by the first shift units 2 is lower than the threshold pulse number, the load on the first signal line 3 is smaller, and the undesirable problem caused by the load is unobvious. At this point, it is possible to choose not to turn on the switch units 6 to save some power consumption. When the number of pulses required to be output by the first shift units 2 is equal to or greater than the threshold pulse number, the load on the first signal line 3 is larger, and the undesirable problem caused by the load is obvious. At this point, it is possible to choose to turn on at least a part of the switch units 6, and the relatively stable and almost uniformly linear voltage on the second signal line 5 is used to counteract the attenuation of the voltage on the first signal line 3, so as to improve the brightness uniformity of the display panel.

Figure 9:
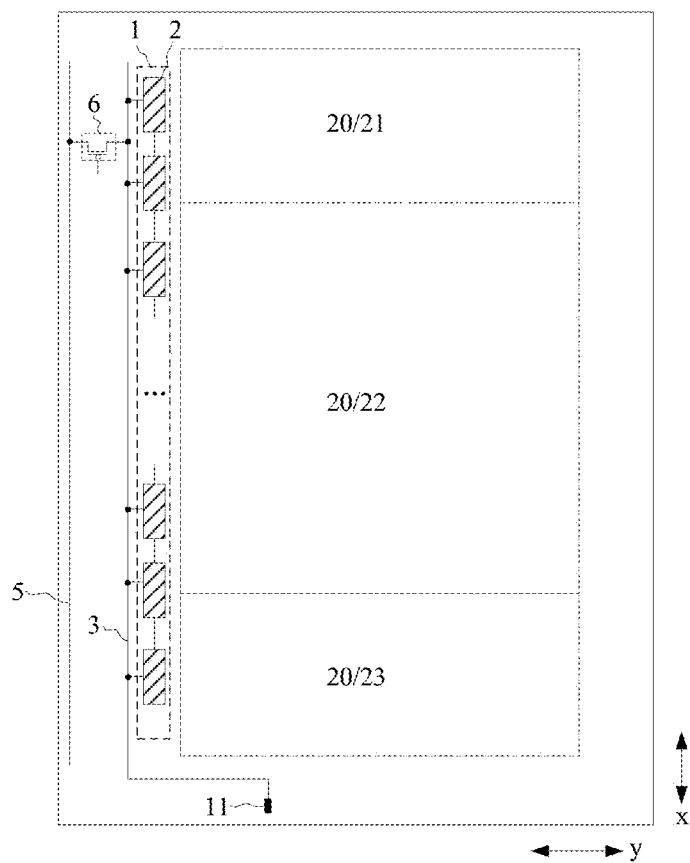
FIG. 9 is yet further structural schematic diagram of a display panel provided by an embodiment of the present disclosure.

In a feasible implementation, as shown in FIG. 9, which is yet further structural schematic diagram of a display panel provided by an embodiment of the present disclosure, the first signal line 3 is electrically connected to a second signal pin 11.

The display panel includes a display area 20, which includes a first edge display area 21, a middle display area 22, and a second edge display area 23 arranged along a first direction x. The first direction x is a direction in which the plurality of first shift units 2 are cascaded. The second edge display area 23 is located on a side of the middle display area 22 close to the second signal pin 11, at least a part of the switch units 6 are located on a side of the first edge display area 21 in a second direction y, and the second direction y intersects with the first direction x.

The foregoing first edge display area 21 is a top side display area away from the second signal pin 11. The closer the voltage signal on the first signal line 3 is transmitted to the top side, the greater the attenuation and the greater the voltage deviation from the standard voltage. To this end, by providing the switch units 6 on one side of the first edge display area 21, the present invention can control the switch units 6 to be turned on in the first mode Mode1, to directly transmit the voltage on the second signal line 5 to the first signal line 3 at the top side position, thereby more directly and effectively adjusting the voltage transmitted by the first signal line 3 at the top side position. For example, when the first signal line 3 and the second signal line 5 receive a high-level voltage, at the top side position, the voltage on the second signal line 5 is directly transmitted to the first signal line 3 to raise the voltage transmitted by the first signal line 3 at the top side position, such that the high-level voltages output by the first shift units 2 on the top and bottom sides tend to be consistent. When the first signal line 3 and the second signal line 5 receive a low-level voltage, at the bottom side position, the voltage on the second signal line 5 is directly transmitted to the first signal line 3 to pull down the voltage transmitted by the first signal line 3 at the bottom side position, such that the low-level voltages output by the first shift units 2 on the top and bottom sides tend to be consistent.

The above method can significantly raise (or pull down) the level signal of the first signal line 3 at the top side position and more effectively reduce the difference between the level voltages transmitted by the first signal line 3 on the top and bottom sides, such that the high-level voltages (or low-level voltages) of the pulses output by the first shift units 2 on the top and bottom sides tend to be consistent.

Figure 10:
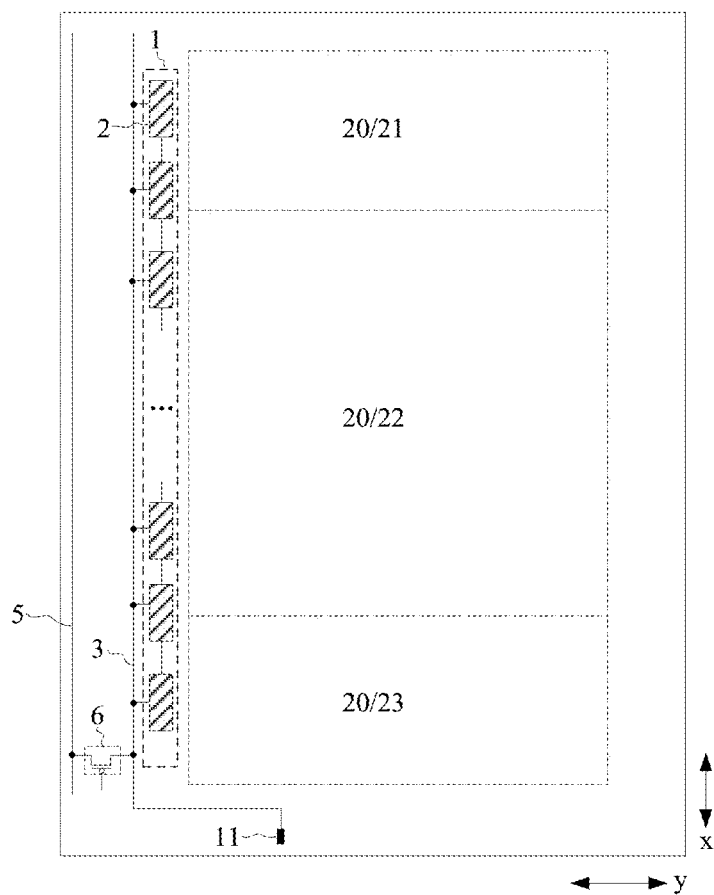
FIG. 10 is yet further structural schematic diagram of a display panel provided by an embodiment of the present disclosure.

And/or, as shown in FIG. 10, which is yet further structural schematic diagram of a display panel provided by an embodiment of the present disclosure, at least a part of the switch units 6 can also be located on a side of the second edge display area 23 in the second direction y.

The foregoing second edge display area 23 is a bottom side display area close to the second signal pin 11. The closer to the second signal pin 11, the more standard the level voltage on the second signal line 5 is. To this end, by providing the switch units 6 on one side of the second edge display area 23, the present invention can control the switch units 6 to be turned on in the first mode Mode1, and the voltage on the second signal line 5 can be directly transmitted to the first signal line 3 at the bottom side position, such that the more standard level voltage can be used to raise (or pull down) the voltage on the first signal line 3.

Figure 11:
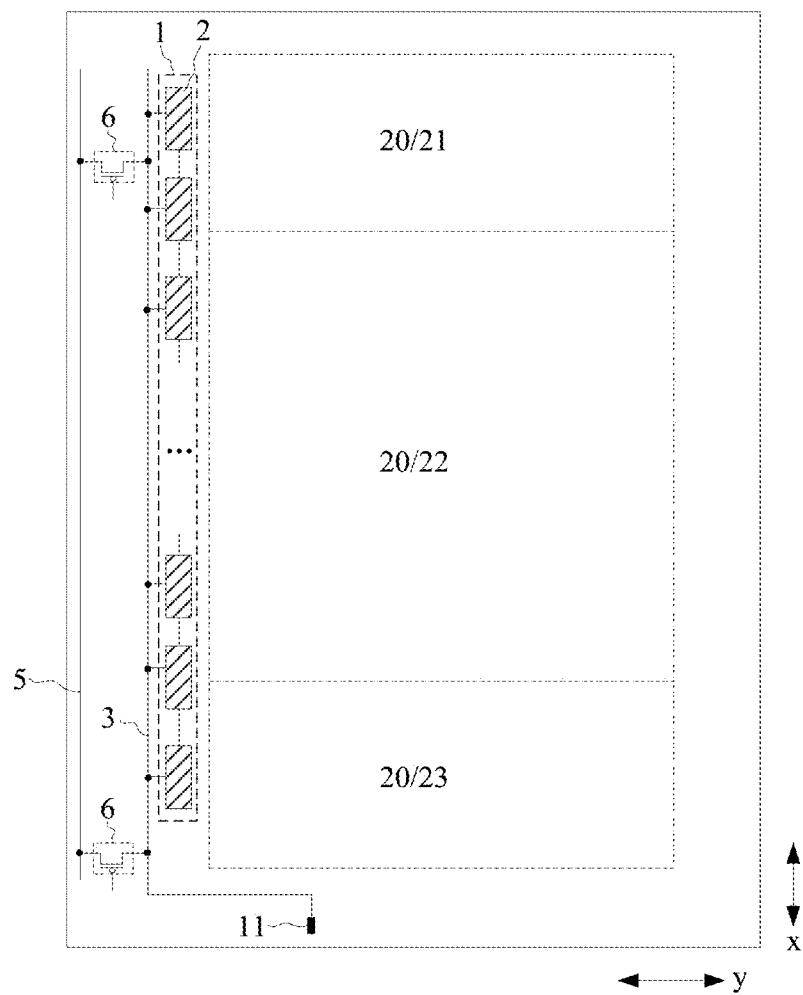
FIG. 11 is yet further structural schematic diagram of a display panel provided by an embodiment of the present disclosure.

In a feasible implementation, as shown in FIG. 11, which is yet further structural schematic diagram of a display panel provided by an embodiment of the present disclosure, the first signal line 3 is electrically connected to the second signal line 5 at at least two positions through the switch units 6. For example, in one structure, the switch units 6 are provided on the side of the first edge display area 21 in the second direction y and on the side of the second edge display area 23 in the second direction y. In this way, the level voltage on the second signal line 5 can be directly transmitted to the first signal line 3 at at least two position, to effectively raise (or pull down) the level voltage transmitted by the first signal line 3 at different positions.

Figure 12:
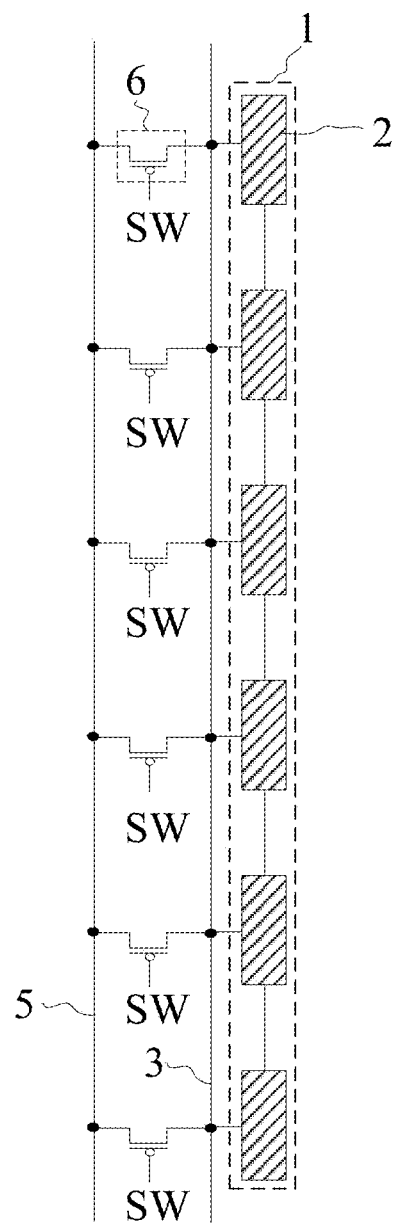
FIG. 12 is yet further structural schematic diagram of a display panel provided by an embodiment of the present disclosure.

In a feasible implementation, as shown in FIG. 12, which is yet further structural schematic diagram of a display panel provided by an embodiment of the present disclosure, at the position of each of the first shift units 2, the first signal line 3 is electrically connected to the second signal line 5 through one switch unit 6, such that the level voltage on the second signal line 5 is directly transmitted to the first signal line 3 at the position of the first shift unit 2 in each stage, and the size of the high-level voltage and/or the size of the low-level voltage output by the first shift unit 2 in each stage tends to be more consistent.

Figure 13:
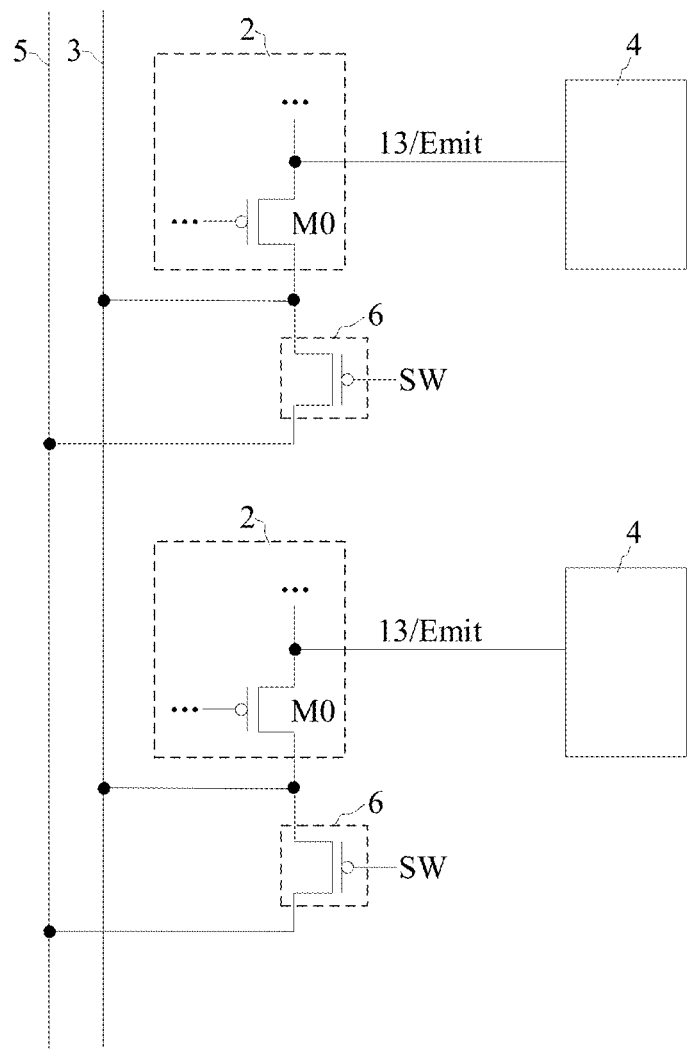
FIG. 13 is a partial structural schematic diagram of a display panel provided by an embodiment of the present disclosure.

In a feasible implementation, as shown in FIG. 13, which is a partial structural schematic diagram of a display panel provided by an embodiment of the present disclosure, the first shift unit 2 includes an output transistor M0. An input end of the output transistor M0 is electrically connected to the first signal line 3, and an output end of the output transistor M0 is electrically connected to the pixel circuits 4 through a driving signal line 13. In particular, the driving signal line 13 can be the light-emitting control signal line Emit. An input end of the switch unit 6 is electrically connected to the second signal line 5, and an output end of the switch unit 6 is electrically connected to the input end of the output transistor M0.

It can be understood that the output transistor M0 of the first shift unit 2 receives the level voltage on the first signal line 3 and outputs it to the driving signal line 13. In the above structure, the switch unit 6 is directly connected to the output transistor M0 of the first shift unit 2. When the switch unit 6 is turned on, the level voltage on the second signal line 5 is directly transmitted to the output transistor M0, to raise (or pull down) the voltage on the input end of the output transistor M0, such that the effect of raising (or pulling down) is more directly reflected in the voltage value output by output transistor M0.

In a feasible implementation, in conjunction with FIG. 4 and FIG. 5, the switch unit 6 includes a switch transistor K, a gate of the switch transistor K is electrically connected to a switch control signal line SW, a first electrode of the switch transistor K is electrically connected to the second signal line 5, and a second electrode of the switch transistor K is electrically connected to the first signal line 3. The switch transistor K is turned on in response to an enable level provided by the switch control signal line SW, and the voltage signal on the second signal line 5 is written into the first signal line 3 through the switch transistor K turned on, thereby raising (or pulling down) the voltage signal on the first signal line 3.

Figure 14:
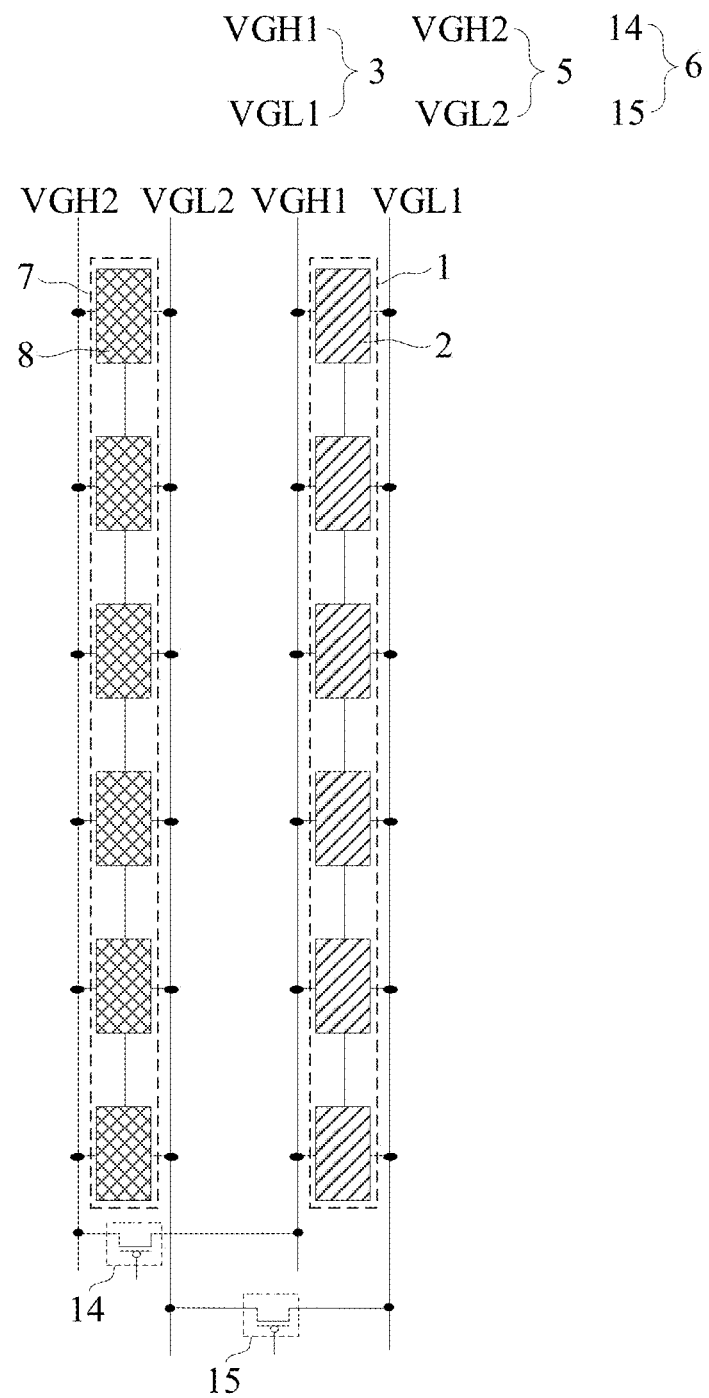
FIG. 14 is yet further structural schematic diagram of a display panel provided by an embodiment of the present disclosure.

In a feasible implementation, as shown in FIG. 14, which is yet further structural schematic diagram of a display panel provided by an embodiment of the present disclosure, the first signal line 3 includes a first high-level signal line VGH1, the second signal line 5 includes a second high-level signal line VGH2, the switch unit 6 includes a first switch unit 14, and the second high-level signal line VGH2 is electrically connected to the first high-level signal line VGH1 through the first switch unit 14.

And/or, the first signal line 3 includes a first low-level signal line VGL1, the second signal line 5 includes a second low-level signal line VGL2, the switch unit 6 includes a second switch unit 15, and the second low-level signal line VGL2 is electrically connected to the first low-level signal line VGL1 through the second switch unit 15.

In the first mode Mode1, the first switch unit 14 and/or the second switch unit 15 is/are turned on. The voltage on the first high-level signal line VGH1 is raised with the aid of the voltage on the second high-level signal line VGH2, to weaken the difference between the high-level voltages output by the first shift units 2 on the top and bottom sides. And/or, the voltage on the first low-level signal line VGL1 is pulled down with the aid of the voltage on the second low-level signal line VGL2, to weaken the difference between the low-level voltages output by the first shift units 2 on the top and bottom sides. This may in turn effectively weaken the difference between the difference value between the high and low levels of the pulses output by the first shift units 2 on the top side and the difference value between the high and low levels of the pulses output by the first shift units 2 on the bottom side, reducing the difference in the coupling of the node voltages on the top and bottom sides caused by the high and low jumps of the signals, and improving the brightness uniformity of the display panel.

Figure 15:
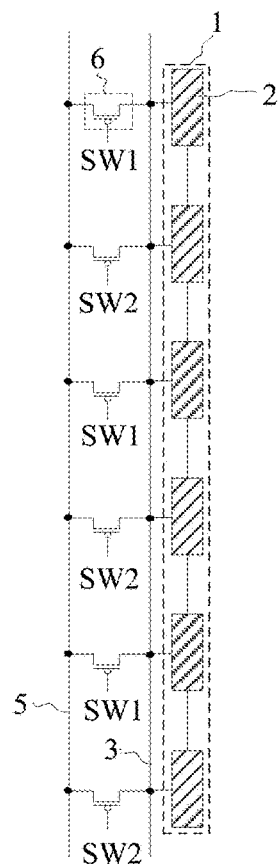
FIG. 15 is yet further structural schematic diagram of a display panel provided by an embodiment of the present disclosure.
Figure 16:
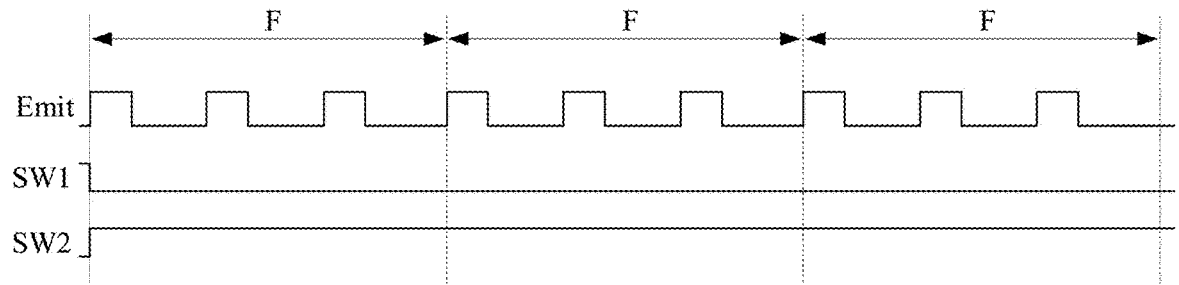
FIG. 16 is another timing diagram provided by an embodiment of the present disclosure.
Figure 16:
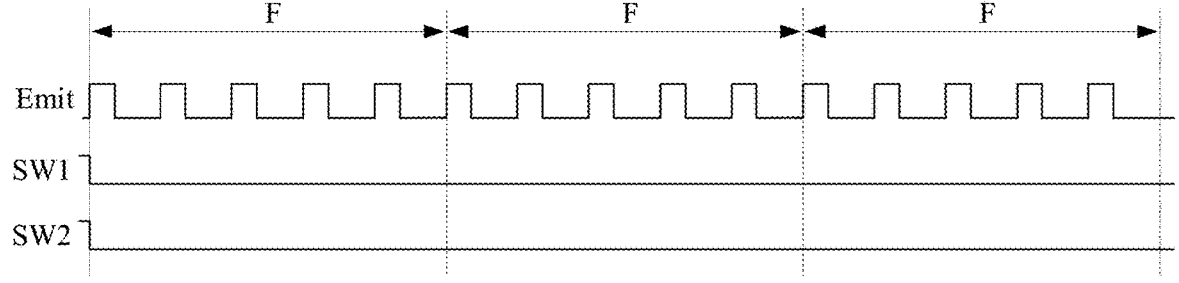

In a feasible implementation, as shown in FIG. 15 and FIG. 16, FIG. 15 is yet further structural schematic diagram of a display panel provided by an embodiment of the present disclosure, and FIG. 16 is another timing diagram provided by an embodiment of the present disclosure, at least two of the switch units 6 are electrically connected between the second signal line 5 and the first signal line 3.

The first mode Mode1 includes a first sub-mode Mode11 and a second sub-mode Mode12, the number of pulses output by the first shift units 2 within one frame F in the first sub-mode Mode11 is less than the number of pulses output by the first shift units 2 within one frame F in the second sub-mode Mode12, and the number of the switch units 6 turned on in the first sub-mode Mode 11 is less than the number of the switch units 6 turned on in the second sub-mode Mode12.

Exemplarily, the number of pulses output by the first shift units 2 within one frame F in the first sub-mode Mode11 is 12, and the number of pulses output by the first shift units 2 within one frame F in the second sub-mode Mode12 is 24. In the first sub-mode Mode11, half of the number of the switch units 6 are turned on, and in the second sub-mode Mode12, all the switch units 6 are turned on.

In the second sub-mode Mode12, the first shift unit 2 in each stage is turned on more times within one frame F, and the load on the first signal line 3 is greater. Therefore, in the second sub-mode Mode12, a larger number of the switch units 6 can be turned on, and the undesirable problem caused by the load on the first signal line 3 is greatly improved. However, in the first sub-mode Mode11, the first shift unit 2 in each stage is turned on less times within one frame F, and thus only part of the switch units 6 may be turned on to save some power consumption.

In conjunction with FIG. 15 and FIG. 16, the switch control signal line SW can include at least a first switch control signal line SW1 and a second switch control signal line SW2, a part of the switch units 6 are electrically connected to the first switch control signal line SW1, and a part of the switch units 6 are electrically connected to the second switch control signal line SW2. In the first sub-mode Mode11, only the first switch control signal line SW1 provides the enable level, and only the switch units 6 connected to the first switch control signal line SW1 are controlled to be turned on. In the second sub-mode Mode12, both the first switch control signal line SW1 and the second switch control signal line SW2 provide the enable level, and the switch units 6 connected to the first switch control signal line SW1 and the second switch control signal line SW2 are controlled to be turned on.

Figure 17:
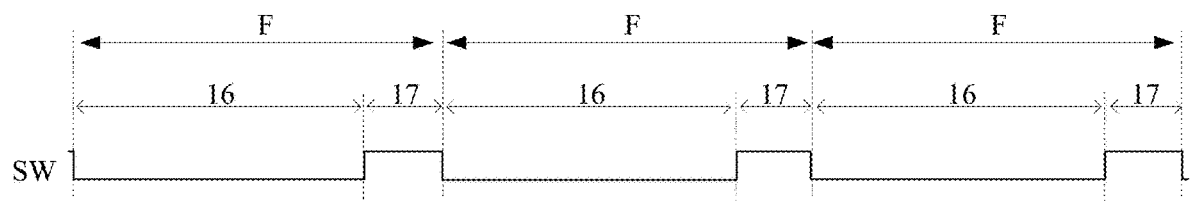
FIG. 17 is yet another timing diagram provided by an embodiment of the present disclosure.

In a feasible implementation, as shown in FIG. 17, which is yet another timing diagram provided by an embodiment of the present disclosure, a frame F includes an effective period 16 and an idle period 17, and the idle period 17 is a period that is located between two adjacent effective periods 16 and is not used to display. In order to save power consumption, the switch units 6 can be turned off in the idle period 17.

Based on the same invention concept, the present disclosure further provides a driving method for a display panel. In conjunction with FIG. 4 and FIG. 5, the display panel includes a first shift register 1, a first signal line 3 and a second signal 5. The first shift register 1 includes a plurality of cascaded first shift units 2; the first signal line 3 is electrically connected to the plurality of first shift units 2 for providing a level voltage required to be output by the first shift units 2; and the second signal line 5 receives a same level voltage as the first signal line 3, and at least one switch unit 6 is connected between the second signal line 5 and the first signal line 3.

The display panel has a first mode Mode1, and the driving method includes: in the first mode Mode1, controlling the first shift units 2 to output at least two pulses within one frame F, and controlling at least a part of the switch units 6 to be turned on.

Combined with the above analysis, in the first mode Mode1, the connection path(s) between the first signal line 3 and the second signal line 5 can be constructed by controlling at least a part of the switch units 6 to be turned on. The voltage on the first signal line 3 is adjusted with the aid of the relatively stable and almost uniformly linear voltage on the second signal line 5. In this way, the attenuation of the voltage on the first signal line 3 is counteracted, and the difference between the level voltages output by the first shift units on the top and bottom sides is weakened, which in turn weakens the difference between the difference value between the high and low levels of the pulses output by the first shift units 2 on the top side and the difference value between the high and low levels of the pulses output by the first shift units 2 on the bottom side, reducing the difference in the coupling of the node voltages on the top and bottom sides caused by the high and low jumps of the signals, and improving the problem of poor brightness uniformity of the panel when driven by multiple pulses.

In a feasible implementation, referring to FIG. 6 and FIG. 7 again, the display panel further includes a second shift register 7 and a third signal line 9. The second shift register 7 includes a plurality of cascaded second shift units 8; and the third signal line 9 is electrically connected to the plurality of second shift units 8 for providing a level voltage required to be output by the second shift units 8, and the third signal line 9 is reused as the second signal line 5.

The driving method further includes: in the first mode Mode1, controlling the number of pulses output by the second shift units 8 to be less than the number of pulses output by the first shift units 2.

Compared with the multi-pulse driving of the first shift units 2, when the second shift units 8 are only subjected to low-pulse driving, the second shift unit 8 in each stage needs to be turned on less times within one frame F, such that the load on the third signal line 9 is less accordingly, and the voltage signal transmitted on the third signal line 9 has less attenuation and better linearity. To this end, in the embodiment of the present disclosure, the third signal line 9 can be directly reused as the second signal line 5 to be connected to the first signal line 3 through the switch units 6. As such, in the first mode Mode1, the attenuation of the voltage on the first signal line 3 can be counteracted with the aid of the voltage on the third signal line 9. In this way, it is not necessary to additionally add another signal line, and the structural design can be simplified.

In a feasible implementation, referring to FIG. 17 again, a frame F includes an effective period 16 and an idle period 17, and the driving method further includes: controlling the switch units 6 to be turned off in the idle period 17 to save power consumption.

Figure 18:
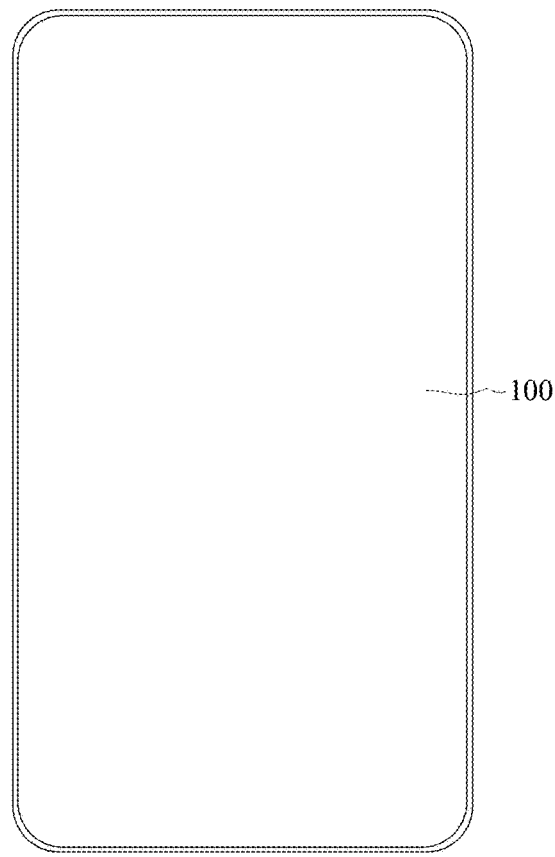
FIG. 18 is a structural schematic diagram of a display device provided by an embodiment of the present disclosure.

Based on the same invention concept, an embodiment of the present disclosure further provides a display device, as shown in FIG. 18, which is a structural schematic diagram of a display device according to the embodiment of the present disclosure. The display device includes the display panel 100 mentioned above. The specific structure of the display panel 100 has been explained in detail in the above embodiments, and will not be repeated here. Of course, the display device shown in FIG. 18 is only for illustrative purposes and can be any electronic device with display function, such as a mobile phone, tablet, laptop, e-paper book, or television.

The above descriptions are merely preferred embodiments of the present disclosure and are not intended to limit the present disclosure. Any modification, equivalent replacement and improvement within the spirit and principle of the present disclosure shall be included within the protection scope of the present disclosure.

Finally, it should be noted that the foregoing embodiments are merely intended to describe and not to limit the technical solutions of the present disclosure. Although the present disclosure has been described in detail with reference to the foregoing embodiments, those skilled in the art should understand that they can still make modifications to the technical solutions described in the foregoing embodiments or make equivalent replacements to some or all of the technical features thereof. These modifications or replacements do not make the essence of the corresponding technical solutions deviate from the scope of the technical solutions in the various embodiments of the present disclosure.

What is claimed is:

1. A display panel, comprising:
a first shift register comprising a plurality of cascaded first shift units;
a first signal line electrically connected to the first shift units for providing a level voltage required to be output by the first shift units; and
a second signal line receiving a same level voltage as the first signal line, wherein at least one switch unit is connected between the second signal line and the first signal line;
wherein the display panel has a first mode, and in the first mode, the first shift units output at least two pluses within one frame, and at least a part of the switch units are turned on.

2. The display panel according to claim 1, further comprising:
a second shift register comprising a plurality of cascaded second shift units; and
a third signal line electrically connected to the second shift units for providing a level voltage required to be output by the second shift units;
wherein in the first mode, within one frame, a number of pulses output by the second shift units is less than a number of pulses output by the first shift units, and the third signal line is reused as the second signal line.

3. The display panel according to claim 2, wherein,
the first shift units are electrically connected to pixel circuits through light-emitting control signal lines, and the second shift units are electrically connected to the pixel circuits through scanning signal lines.

4. The display panel according to claim 1, wherein,
the second signal line is electrically connected only to a first signal pin and the switch units.

5. The display panel according to claim 1, wherein,
in the first mode, a number of pulses output by the first shift units within one frame is greater than or equal to 12.

6. The display panel according to claim 1, wherein,
the first signal line is electrically connected to a second signal pin; and
the display panel further comprises a display area, the display area comprises a first edge display area, a middle display area and a second edge display area arranged along a first direction, the first direction is a direction in which the plurality of first shift units are cascaded, wherein the second edge display area is located on a side of the middle display area close to the second signal pin, at least a part of the switch units are located on a side of the first edge display area in a second direction, and the second direction intersects with the first direction.

7. The display panel according to claim 1, wherein,
the first signal line is electrically connected to a second signal pin; and
the display panel further comprises a display area, the display area comprises a first edge display area, a middle display area and a second edge display area arranged along a first direction, the first direction is a direction in which the plurality of first shift units are cascaded, wherein the second edge display area is located on a side of the middle display area close to the second signal pin, at least a part of the switch units are located on a side of the second edge display area in a second direction, and the second direction intersects with the first direction.

8. The display panel according to claim 1, wherein,
the first signal line is electrically connected to the second signal line through the switch units at at least two positions.

9. The display panel according to claim 1, wherein,
at a position of each of the first shift units, the first signal line is electrically connected to the second signal line through one of the switch units.

10. The display panel according to claim 1, wherein,
each of the first shift units comprises an output transistor, an input end of the output transistor is electrically connected to the first signal line, and an output end of the output transistor is electrically connected to the pixel circuits through a driving signal line; and
an input end of the switch unit is electrically connected to the second signal line, and an output end of the switch unit is electrically connected to the input end of the output transistor.

11. The display panel according to claim 1, wherein,
the switch unit comprises a switch transistor, a gate of the switch transistor is electrically connected to a switch control signal line, a first electrode of the switch transistor is electrically connected to the second signal line, and a second electrode of the switch transistor is electrically connected to the first signal line.

12. The display panel according to claim 1, wherein,
the first signal line comprises a first high-level signal line, the second signal line comprises a second high-level signal line, the switch units comprise a first switch unit, and the second high-level signal line is electrically connected to the first high-level signal line through the first switch unit; and/or the first signal line comprises a first low-level signal line, the second signal line comprises a second low-level signal line, the switch units comprise a second switch unit, and the second low-level signal line is electrically connected to the first low-level signal line through the second switch unit.

13. The display panel according to claim 1, wherein,
at least two of the switch units are connected between the second signal line and the first signal line; and
the first mode comprises a first sub-mode and a second sub-mode, a number of pulses output by the first shift units within one frame in the first sub-mode is less than a number of pulses output by the first shift units within one frame in the second sub-mode, and a number of the switch units turned on in the first sub-mode is less than a number of the switch units turned on in the second sub-mode.

14. The display panel according to claim 1, wherein,
a frame comprises an effective period and an idle period, and the switch units are turned off in the idle period.

15. A driving method for a display panel, wherein the display panel comprises:
a first shift register comprising a plurality of cascaded first shift units;
a first signal line electrically connected to the first shift units for providing a level voltage required to be output by the first shift units; and
a second signal line receiving a same level voltage as the first signal line, wherein at least one switch unit is connected between the second signal line and the first signal line;
the display panel has a first mode, and the driving method comprises: in the first mode, controlling the first shift units to output at least two pulses within one frame, and controlling at least a part of the switch units to be turned on.

16. The driving method according to claim 15, wherein the display panel further comprises:
a second shift register comprising a plurality of cascaded second shift units; and
a third signal line electrically connected to the second shift units for providing a level voltage required to be output by the second shift units, wherein the third signal line is reused as the second signal line;
the driving method further comprises: in the first mode, controlling a number of pulses required to be output by the second shift units to be less than a number of pulses required to be output by the first shift units.

17. The driving method according to claim 15, wherein,
a frame comprises an effective period and an idle period, and the driving method further comprises: controlling the switch units to be turned off in the idle period.

18. A display device, comprising a display panel, wherein the display panel comprises:
a first shift register comprising a plurality of cascaded first shift units;
a first signal line electrically connected to the first shift units for providing a level voltage required to be output by the first shift units; and
a second signal line receiving a same level voltage as the first signal line, wherein at least one switch unit is connected between the second signal line and the first signal line;
wherein the display panel has a first mode, and in the first mode, the first shift units output at least two pluses within one frame, and at least a part of the switch units are turned on.

* * * * *